US006735518B2

(12) United States Patent
Kim

(10) Patent No.: US 6,735,518 B2
(45) Date of Patent: May 11, 2004

(54) ROUTE GUIDING METHOD IN A NAVIGATION SYSTEM USING A WIRELESS NETWORK

(75) Inventor: Jung-Soo Kim, Songnam-shi (KR)

(73) Assignee: Samsung Electronics Co., Ltd. (KR)

( * ) Notice: Subject to any disclaimer, the term of this patent is extended or adjusted under 35 U.S.C. 154(b) by 0 days.

(21) Appl. No.: 10/139,693

(22) Filed: May 3, 2002

(65) Prior Publication Data

US 2002/0165665 A1 Nov. 7, 2002

(30) Foreign Application Priority Data

May 3, 2001 (KR) ........................................ 2001-24176
Feb. 25, 2002 (KR) ........................................... 2002-9977

(51) Int. Cl.[7] ............................................. G01C 21/00
(52) U.S. Cl. ...................... 701/209; 701/208; 701/211; 340/990; 340/995
(58) Field of Search ................................ 701/209, 200, 701/202, 208, 211; 340/990, 995

(56) References Cited

U.S. PATENT DOCUMENTS 6,122,593 A * 9/2000 Friederich et al. .......... 701/202
6,249,742 B1 * 6/2001 Friederich et al. .......... 701/202

* cited by examiner

Primary Examiner—Marthe Y. Marc-Coleman
(74) Attorney, Agent, or Firm—Dilworth & Barrese, LLP

(57) ABSTRACT

A route guidance method in a navigation system using a wireless network, wherein a navigation terminal receives route guidance data by which a moveable object is guided to a destination via a plurality of node points in an optimum route from an information center. The navigation terminal determines whether a user has requested a preview of an optimum route. If the preview has been requested, the navigation terminal determines whether preview information is to be provided in text or in image. Upon request for the preview in text, the navigation terminal displays comprehensive route information in text. Upon request for the preview in image, the navigation terminal generates preview information about each node point on the optimum route based on the route guidance data and displays the preview information in image.

13 Claims, 11 Drawing Sheets

ROUTE GUIDING METHOD IN A NAVIGATION SYSTEM USING A WIRELESS NETWORK

PRIORITY

This application claims priority to an application entitled "Route Guiding Method in Navigation System using Wireless Network" filed in the Korean Industrial Property Office on May 3, 2001 and assigned Serial No. 2001-24176, and to an application entitled "Route Guiding Method in Navigation System using Wireless Network" filed in the Korean Industrial Property Office on Feb. 25, 2002 and assigned Serial No. 2002-9977, the contents of both of which are hereby incorporated by reference.

BACKGROUND OF THE INVENTION

1. Field of the Invention

The present invention relates generally to a navigation system using a wireless network, and in particular, to a route guiding method in which route guidance data including comprehensive route information is provided to a moveable object in advance, regardless of whether the moveable object is moving or not.

2. Description of the Related Art

FIG. 1 illustrates a configuration of a navigation system using a wireless network. Referring to FIG. 1, the navigation system includes an information center 100, a wireless network 200, a mobile terminal 300, and an ITS (Intelligent Transportation System) terminal 400. The mobile terminal 300 connected to the ITS terminal 400 sends information including its current location and desired destination to the information center 100 via the wireless network 200, requesting information about the optimum route. The information center 100 searches for the optimum route between the current location and the destination, generates route guidance data containing information about multiple node points, and sends the route guidance data to the mobile terminal 300. The mobile terminal 300 then stores the route guidance data.

Once a moveable object begins moving, the mobile terminal 300 continuously provides information about routes running through the node points in the traveling direction of the moveable object based on the route guidance data in interaction with the ITS terminal 400. Since the mobile terminal usually has a small display (e.g., an LCD (Liquid Crystal Display)), it does not display comprehensive map data but an intersection image representing a node point, distance to go, expected arrival time, and the current road name.

With the partial route information about an optimum route, the navigation system cannot provide a comprehensive navigation service to a user because the user will not be able to recognize a guided route.

SUMMARY OF THE INVENTION

It is, therefore, an object of the present invention to provide a route guiding method that allows a user to readily identify an optimum route.

It is another object of the present invention to provide a route guiding method that provides comprehensive optimum route information.

The foregoing and other objects are achieved by providing a route guiding method in a navigation system. The navigation system comprises (1) an information center including a map database, (2) a navigation terminal located within a moveable object including a mobile terminal, wirelessly connected to a wireless network, and an ITS terminal with a GPS (Global Positioning System) device for detecting the current location of the moveable object, and (3) the wireless network for connecting the information center and the navigation terminal wirelessly. The navigation terminal receives route guidance data by which the moveable object is guided to a destination via a plurality of node points in an optimum route from the information center. The navigation terminal determines whether a user has requested a preview of the optimum route. If the preview has been requested, the navigation terminal determines whether preview information is to be provided in text or in image. Upon request for the preview in text, the navigation terminal displays the comprehensive route information in text. Upon request for the preview in image, the navigation terminal generates preview information about each node point on the optimum route based on the route guidance data and displays the preview information in image.

BRIEF DESCRIPTION OF THE DRAWINGS

The above and other objects, features and advantages of the present invention will become more apparent from the following detailed description when taken in conjunction with the accompanying drawings in which.

DETAILED DESCRIPTION OF THE PREFERRED EMBODIMENT

A preferred embodiment of the present invention will be described hereinbelow with reference to the accompanying drawings. In the following description, well-known functions or constructions are not described in detail since they would obscure the invention in unnecessary detail.

Figure 1:
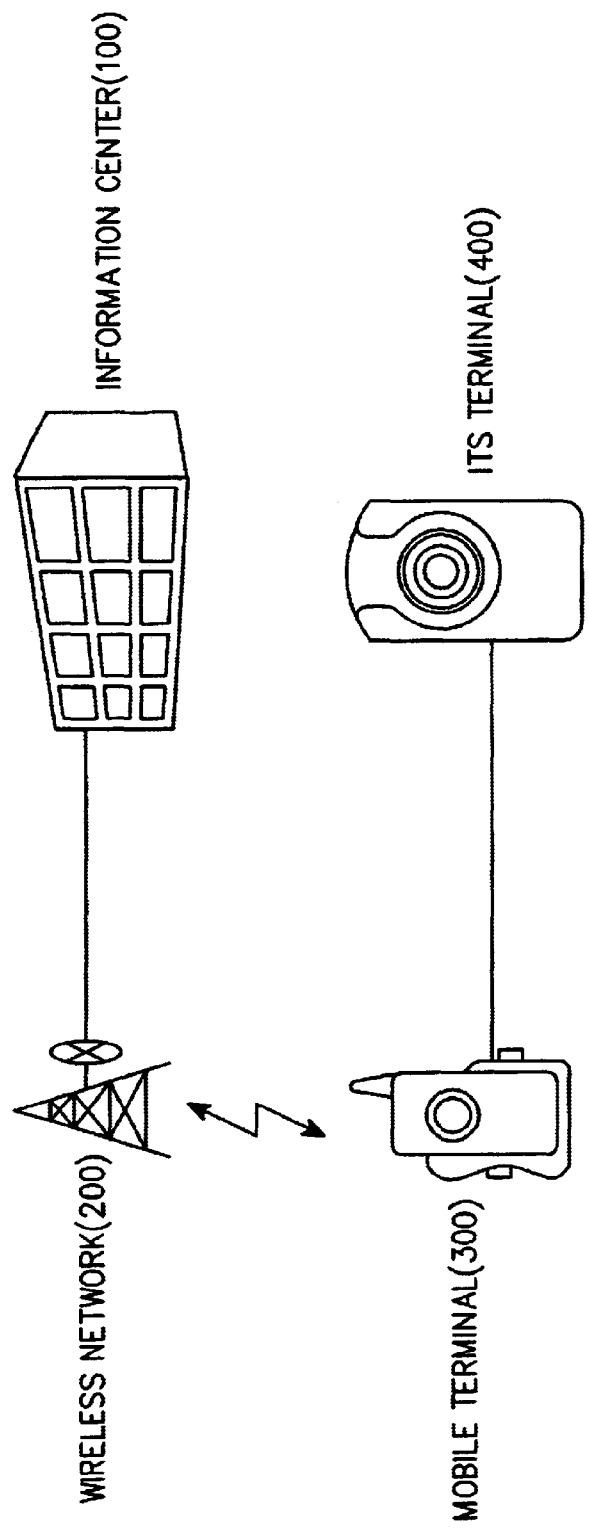
FIG. 1 illustrates the configuration of a navigation system using a wireless network.

A description will first be made of a navigation system using a wireless network to which the present invention applies. Referring to FIG. 1, the navigation system includes the information center 100, the wireless network 200, the mobile terminal 300, and the ITS terminal 400, as stated before.

The information center 100 includes map data and real time traffic information. Upon request for navigation from the mobile terminal 300, the information center 100 generates corresponding navigation information referring to the map data and the real time traffic information and provides the navigation information to the mobile terminal 300 via the wireless network. For example, if the mobile terminal 300 requests an optimum route between its current location and its destination, the information center 100 generates information needed to guide the mobile terminal 300 to the destination by the optimum route based on the map data and the real time traffic information.

The wireless network 200 serves as an information transmission link between the information center 100 and the mobile terminal 300. A PCS (Personal Communication System) system or a digital cellular system based on IS-95A, 95B or 95C can be used as the wireless communication network 200. A CDMA (Code Division Multiple Access) system such as IMT-2000 (International Mobile Telecommunications-2000) or UMTS (Universal Mobile Telecommunication Systems) can be also employed as the wireless communication network 200.

The mobile terminal 300 operates in a navigation mode according to the present invention and in a typical voice call mode. In the navigation mode, the mobile terminal 300 is connected to the wireless communication network 200, receives navigation information from the information center 100, and provides the navigation information to the user in cooperation with the ITS terminal 400.

In the navigation mode, the user sets the present location of the vehicle (or moveable object) and the desired destination in the mobile terminal 300, requests guidance to an optimum route from the information center 100, and receives information including the optimum route from the information center 100. Here, the user can set the destination by the name of a facility, a local category, a province, a phone number, and a 2-D (latitude and longitude) coordinate by voice or by characters. The user can also receive traffic information (e.g., information about what is ahead, downtown, provincial roads, highways, book-marked waypoints, etc.) from the information center 100. In addition, the user can search for facilities along the optimum route (i.e., gas stations, repair centers, banks, clinics, drugstores, lodging, places for sightseeing, restaurants, coffee shops, and cinemas/theaters) and receive other information such as news, weather forecasts, TV programs, movies, plays, performances, horoscope, and humorous tips.

The components of the above navigation system will be described herein below in detail with reference to FIGS. 2 and 3.

Figure 2:
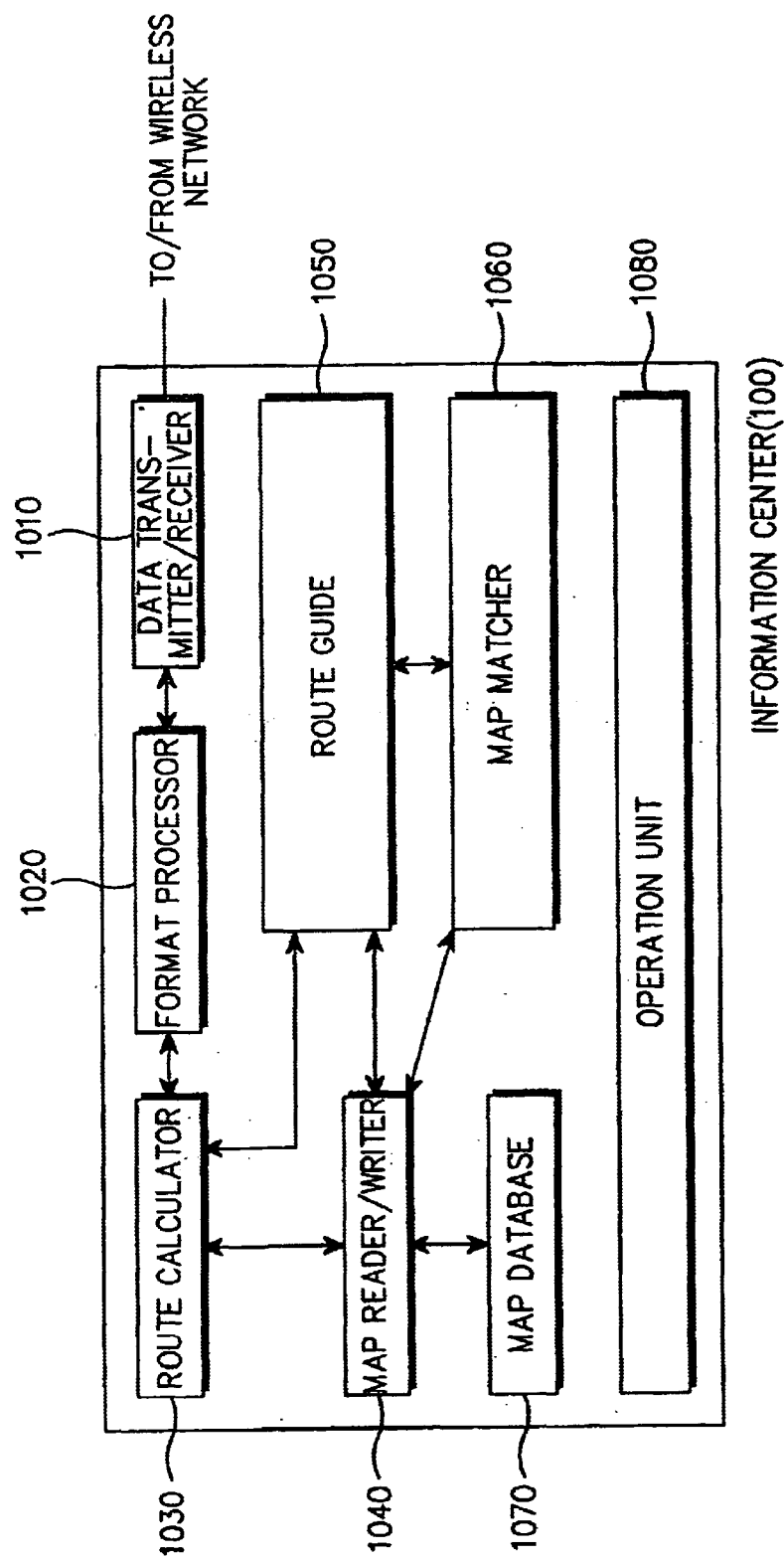
FIG. 2 is a block diagram of an information center that provides route guidance functionality according to an embodiment of the present invention.

FIG. 2 is a block diagram of the information center 100 for providing route guidance functionality according to the embodiment of the present invention. Referring to FIG. 2, the information center 100 includes a transmitter/receiver 1010, a format processor 1020, a route calculator 1030, a map reader/writer 1040, a route guide 1050, a map matcher 1060, a map database 1070, and an operation unit 1080.

The transmitter/receiver 1010 converts a transmission signal to a signal suitable for the wireless network 200 prior to transmission and receives a signal from the wireless network 200. The format processor 1020 converts data to a format preset between the information center 100 and the wireless network 200, and interprets a signal received from the transmitter/receiver 1010 according to the preset format. The route calculator 1030 calculates an optimum route between two given points, that is, between the present position and a destination. The map database 1070 is a CD-ROM or a memory for storing maps. The map reader/writer 1040 reads a necessary map from the map database 1070 and writes a map in the map database 1070. The map reader/writer 1040 updates the map in real time. The route guide 1050 extracts turning points, turning direction, and reference information along the optimum route calculated by the route calculator 1030. That is, the route guide 1050 extracts data necessary for a route guide 1150 of a navigation terminal, which will be later described with reference to FIG. 3. The map matcher 1060 pinpoints received coordinates on a map, that is, detects the position of a given point in the map database 1070. The operation unit 1080 is a block for operating and managing the information center 100.

As described above, the information center 100, including the map data and the real time traffic information, generates information required to guide the vehicle in which the mobile terminal 300 is positioned, from the current location to the destination, by an optimum route based on the map data and the real time traffic information, and feeds the information to the wireless network 200. The wireless network 200 is connected to the mobile terminal 300 and transmits the present location and destination information of the mobile terminal 300 to the information center 100. The wireless network 200 also provides the optimum route information to the mobile terminal 300 upon request from the mobile terminal. This wireless network 200 is designed to provide a wireless connection service to the mobile terminal 300. As stated before, a CDMA digital cellular system, a PCS system, or an IMT-2000 system is available as the wireless network 200.

Figure 3:
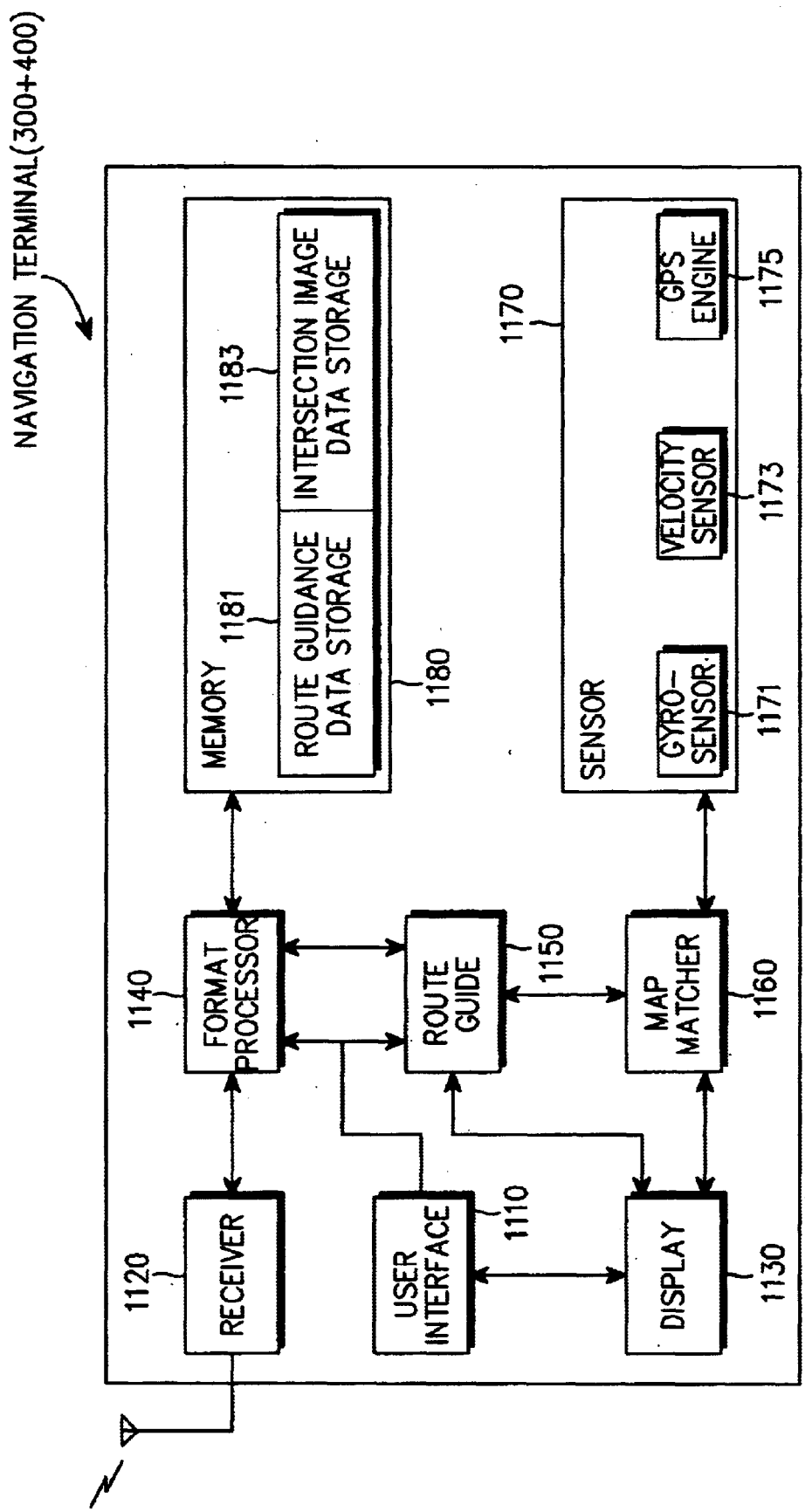
FIG. 3 is a block diagram of a navigation terminal according to the present invention.

FIG. 3 is a block diagram of the mobile terminal 300 and the ITS terminal 400 for route guidance according to the embodiment of the present invention. While the mobile terminal 300 and the ITS terminal 400 are separated in FIG. 1, these terminals can be integrated into a single terminal. In addition, in view of interaction between the mobile terminal 300 and the ITS terminal 400 for route guidance, they are illustrated and may be constructed into one terminal in the aspect of navigation in FIG. 3. For clarity of description, the mobile terminal 300 and the ITS terminal 400 in combination are termed a navigation terminal.

Referring to FIG. 3, the navigation terminal includes a user interface 1110, a transmitter/receiver 1120, a display 1130, a format processor 1140, the route guide 1150, a map matcher 1160, a sensor 1170, and a memory 1180.

The user interface 1110 serves as an input portion through which a user requests a navigation service, selecting a navigation mode and setting a starting point and an ending point in the navigation mode. The user interface 1110 interfaces the user with the information center 100. The display 1130 also interfaces the user with the information center 100 like the user interface 1110 by displaying a map, a destination, and routes during the navigation operation. The transmitter/receiver 1120 exchanges signals with the wireless network 200. The format processor 1140 converts data according to the format preset between the wireless network 200 and the information center 100 and interprets a signal received from the transmitter/receiver 1120 according to the preset format. The route guide 1150 guides the navigation terminal to the destination and processes route guidance data. The sensor 1170 extracts data required for vehicle tracking. The map matcher 1160 pinpoints the varying positions of the vehicle on a map by comparing the route guidance data received from the information center 100 with location data received from the sensor 1170.

The user interface 1110 corresponds to the keypad of the mobile terminal 300 or the touch screen in a premium navigation system. The display 1130 corresponds to the display of the mobile terminal 300 or a TFT-LCD of the premium navigation system. The transmitter/receiver 1120 corresponds to the transmitter/receiver of the mobile terminal 300.

The sensor 1170 includes a GPS antenna, a gyro-sensor 1171, a velocity sensor 1173, and a GPS engine 1175. The gyro-sensor 1171 senses the driving angle of the vehicle and the velocity sensor 1173 senses the velocity of vehicle. The GPS antenna receives signals from GPS satellites. The GPS engine 1175 calculates pseudo-coordinates of the present location of the vehicle based on the GPS satellite signals. The route guide 1150 and the map matcher 1160 calculate the present pseudo-position of the vehicle based on its driving angle and velocity received from the sensors 1171 and 1173, and select one of the pseudo-coordinates of the vehicle calculated in the route guide 1150 and the GPS engine 1175. If an accumulated error is small, the route guide 1150 selects its calculated value, and if the accumulated error is large, the route guide 1150 compensates for the accumulated error by the value received from the GPS engine 1175.

The memory 1180 includes a route guidance data storage 1181 and an intersection image data storage 1183. The memory 1180 temporarily stores programs necessary to execute the operations of the route guide 1150 and the map matcher 1160, and data processed during the operations. According to an embodiment of the present invention, the memory 1180 additionally stores a program for performing a preview function.

A preview menu is a menu that the user chooses to get the comprehensive information of an optimum route based on the route guidance data regardless of the moving state of the vehicle. The preview menu contains sub-menus "text" and "image". If the user chooses text, the display 1130 displays information about intersections, roads, distance, and expected time in the optimum route in the text from. The text sub-menu contains menu items such as route guide start, highway search, normal road search, and shortest route search according to the embodiment of the present invention. By choosing one of the menu items, the user requests specific route guidance or conditional route search. The sub-menu image provides the comprehensive optimum route information visually. If image is chosen, the navigation terminal provides a visual display of each node point in the optimum route. The preview information includes the intersection information of each node point, the direction the vehicle is to take at the next node point, distance to the next node point, expected arrival time at the next node point, the name of the next node point, a road type at the next node point, the direction the vehicle is pointing (heading), the direction to the destination (bearing), GPS signal reception status, and a menu notification.

Figure 6:
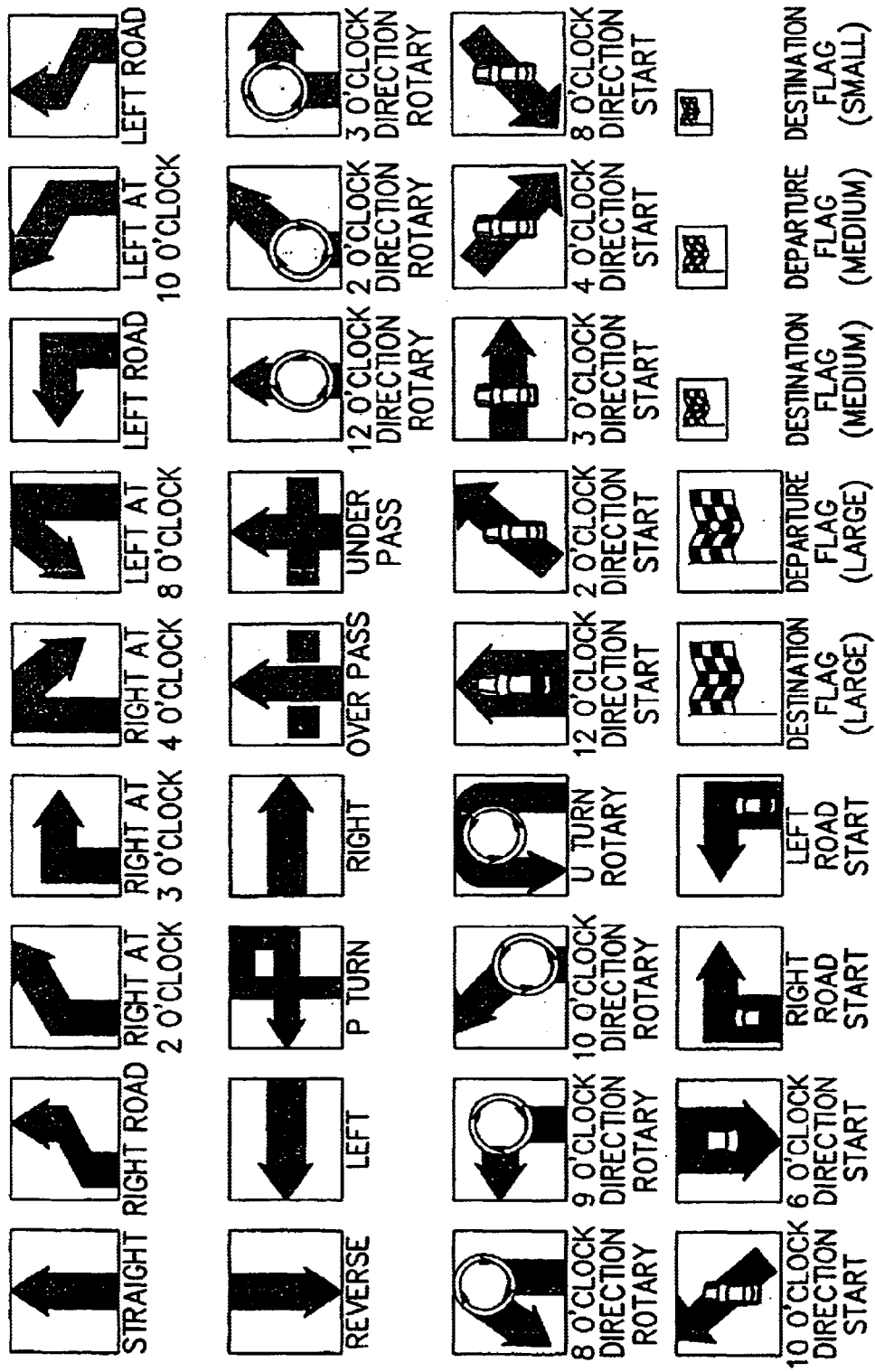
FIG. 6 illustrates a set of intersection images for route guidance according to the embodiment of the present invention.

The route guidance data storage 1181 stores the route guidance data received from the information center 100 via the wireless network 200. The intersection image data storage 1183 stores such intersection image data as illustrated in FIG. 6. FIG. 6 illustrates a set of intersection images for use in route guidance according to the embodiment of the present invention. Referring to FIG. 6, the intersection image data set is composed of 39 images. For example, there are direction images instructing go straight, turn right, turn left, U turn, P turn, over pass, and under pass, direction-at-rotary images representing 12 o'clock direction rotary, 4 o'clock direction rotary, and U-turn rotary, and other images representing starting points and destinations. These image data are stored in the intersection image data storage 1183 and displayed on the display 1130 for route guidance.

As described above, the navigation terminal in the navigation system according to the present invention is provided with the user interface 1110, the format processor 1140, the route guide 1150, the map matcher 1160, and the sensor 1170, for guiding the user to his destination by an optimum route based on information received from the information center 100.

In operation, the navigation terminal transmits a user request for navigation to the information center 100 via the wireless network 200. The information center 100 recognizes the user request, generates corresponding data, and transmits it to the navigation terminal via the wireless network 200. Here, the navigation terminal transmits all related information required to request route guidance such as a destination to the information center 100, and the information center 100 generates route guidance data internally and transmits it to the navigation terminal via the wireless network 200.

The information needed to generate the route guidance data can be requested to the user through the user interface 1110 and the display 1130. This route guidance request information is formatted in the format processor 1140 and transmitted to the wireless network 200 via the transmitter/receiver 1120.

The transmitter/receiver 1010 of the information center 100 receives the route guidance request information and the format processor 1020 interprets the route guidance request information. The interpreted route guidance information is fed to the route calculator 1030 and the route guide 1050. Then the route calculator 1030 calculates an optimum route based on map data from the map database 1070 and the map reader/writer 1040, and acquires data needed for guidance by the calculated optimum route from the map matcher 1060, the map reader/writer 1040, and the map database 1070. The route guidance data is formatted in the format processor 1020 and transmitted to the transmitter/receiver 1120 of the navigation terminal via the transmitter/receiver 1010 and the wireless network 200.

The received route guidance data is interpreted in the format processor 1140 of the navigation terminal. The route guide 1150 generates data such as distance to a turning point, turning direction, on track or off track, expected arrival time to the destination, and distance to go based on the present position data obtained by the sensor 1170 and the map matcher 1160 and the route guidance data received from the format processor 1140, and displays the generated data on the display 1130, outputting it to the user audibly. Thus the user is guided to the destination via the optimum route.

Figure 4:
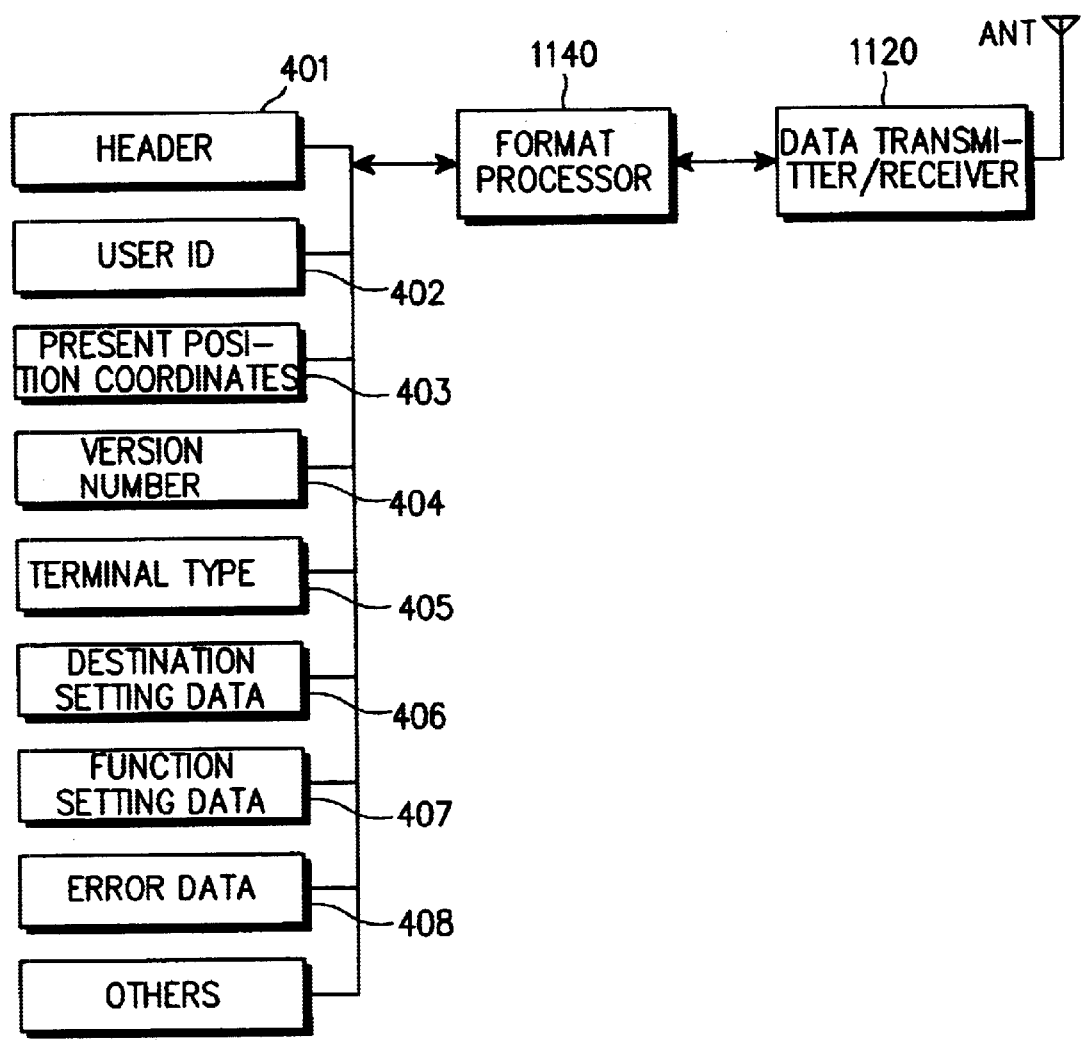
FIG. 4 illustrates a structure of route guidance request data directed from the navigation terminal to the information center via a wireless network according to the embodiment of the present invention.

FIG. 4 illustrates the structure of route guidance request data transmitted from the navigation terminal to the information center 100 through the wireless network 200 according to the present invention. Referring to FIG. 4, the format processor 1140 of the navigation terminal receives data containing a header 401, a user ID (Identification) 402, the coordinates of the present position 403, a version number 404, a terminal type 405, destination setting data 406, function setting data 407, and error data 408, and formats the received data. The transmitter/receiver 1120 converts the formatted data to a signal suitable for transmission and transmits the converted transmission signal through the antenna ANT. The transmission signal reaches the information center 100 over the wireless network 200. The header 401 indicates that the data is a route guidance request. The user ID 402 is information used to authenticate a subscriber as registered for a navigation service. The present position coordinates 403 are expressed in latitude and longitude calculated by a GPS system in the navigation terminal and the destination setting data 406 is input from the user by characters (text) or by voice via the navigation terminal. The terminal type 405 is information indicative of the size and type of a terminal display on which the route guidance is requested and route guidance data is to be displayed.

Figure 5:
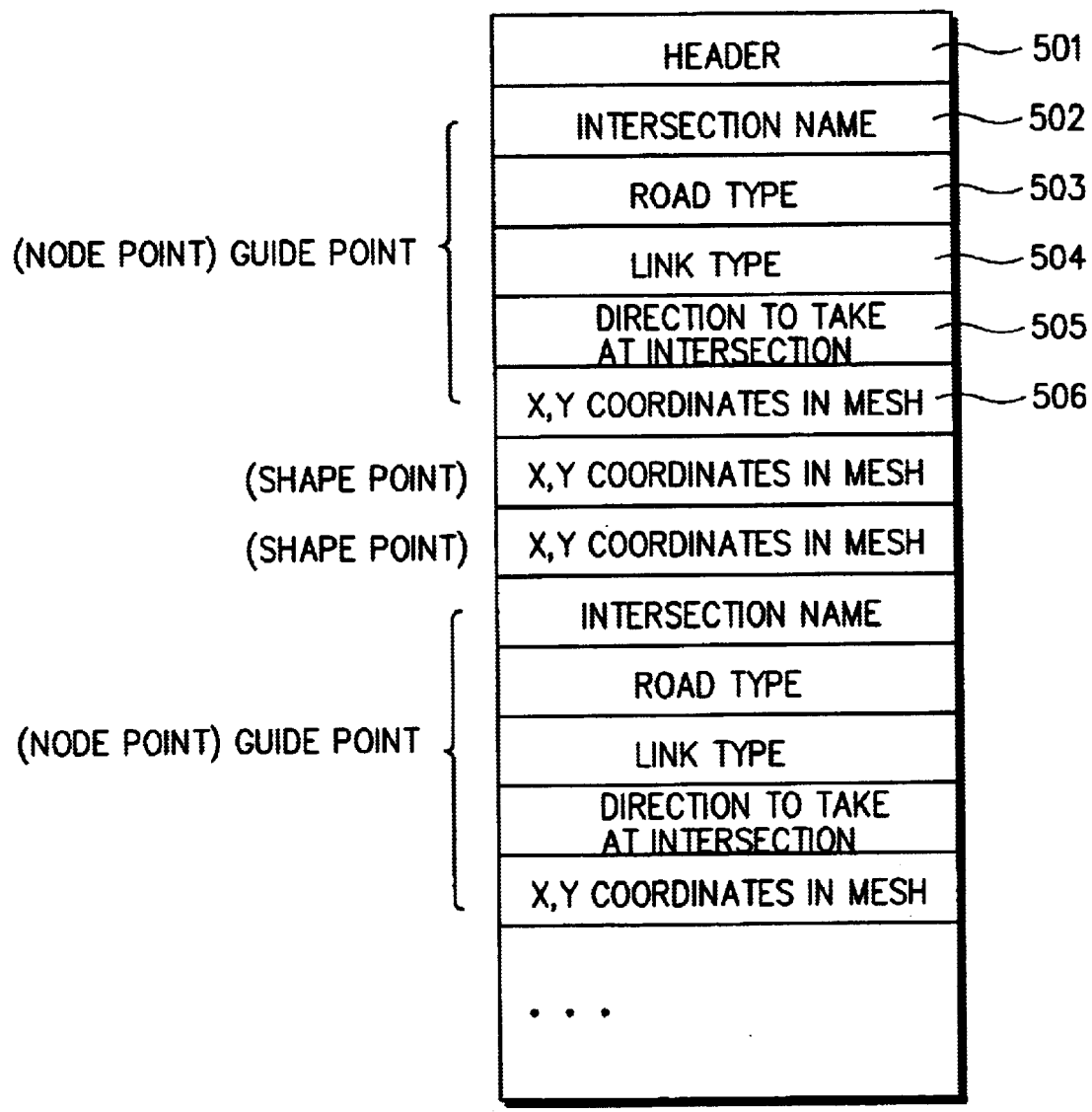
FIG. 5 illustrates a structure of route guidance data according to the embodiment of the present invention.

FIG. 5 illustrates a structure of route guidance data according to the embodiment of the present invention. Referring to FIG. 5, the route guidance data is comprised of a header 501, node point information, and shape point information. The node point information includes the name of an intersection 502, a road type 503, a link type 504, the direction in which the vehicle is to take at the intersection 505, and X and Y coordinates in a mesh 506. The intersection name 502 is in text data such as "the intersection of Pasadena Avenue and Walnut Street". The road type 503 indicates a road class like highway, freeway, or local road. The link type 504 includes U-turn, rotary, over pass, under pass, bridge, etc. The direction the vehicle is to take at the intersection 505 is in, out, left, or right.

Route guidance data is generated from information about links and nodes in an optimum route between a present position A and a destination B. Information about links and nodes a' and a" within a particular geographic region including either part or the whole optimum route between the present position A and the destination B is generated as route guidance data.

Figure 7:
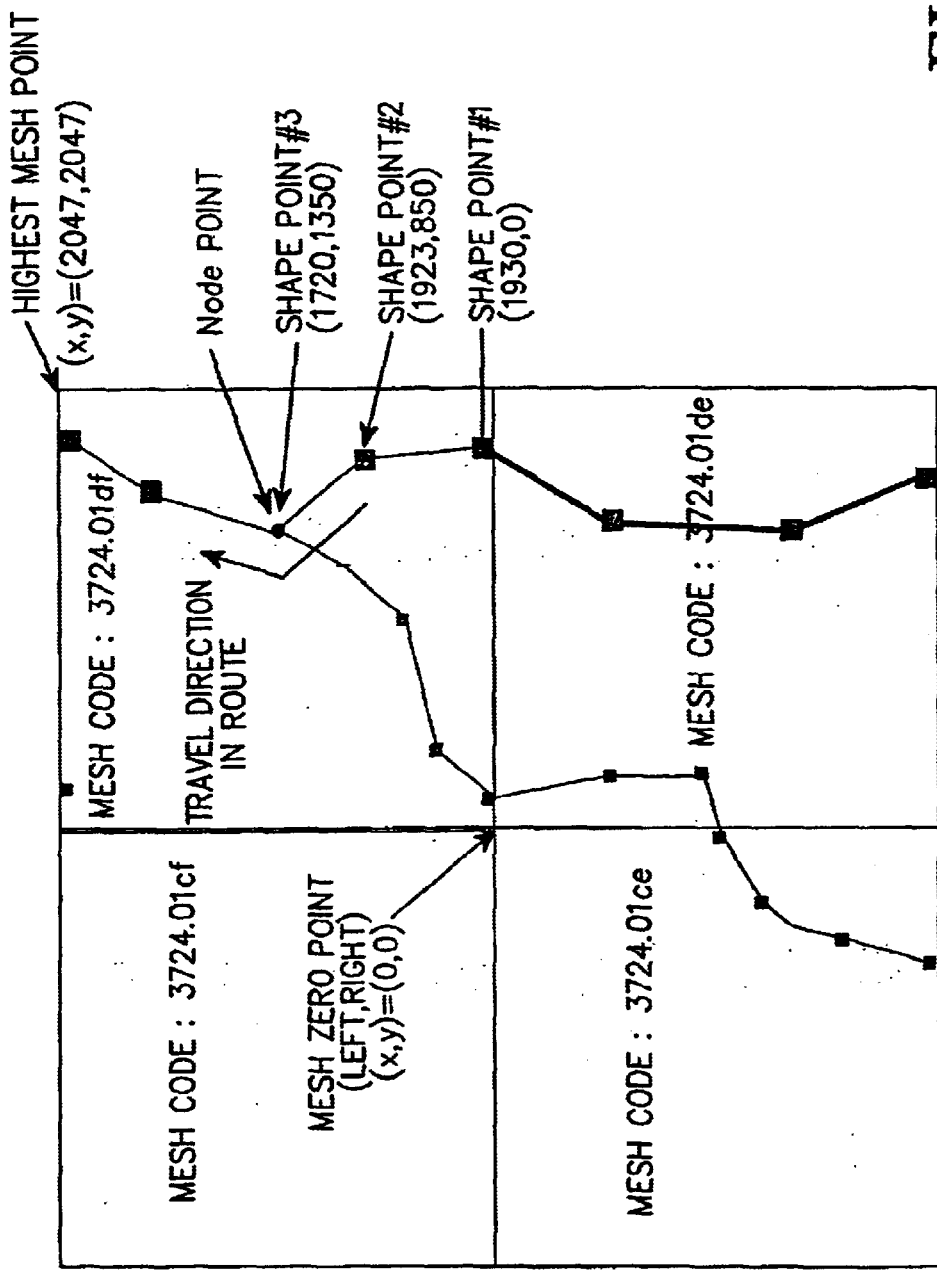
FIG. 7 illustrates a route guidance data mesh system according to the embodiment of the present invention.

FIG. 7 illustrates a route guidance data mesh system according to the embodiment of the present invention. Referring to FIG. 7, mesh codes are assigned to mesh areas partitioned in meshes by every predetermined longitude and latitude lines. The mesh codes are mapping units because every digital map is constructed with map data based on meshes. A node point is a road junction where a user is guided. A shape point is a waypoint that does not form a road junction but is marked to maintain road linearity. The shape points refer to all waypoints drawn on a map to maintain road linearity. The linearity of an actual road is known from the coordinates of each shape point, which are compared with latitude and longitude coordinates obtained from the GPS system of the navigation terminal. The node point, in other words, is a shape point where two or more linear roads intersect.

A guidance code is information necessary for route guidance at a node point, that is, a road junction. That is, the guidance code represents an action required to guide the vehicle's travel, such as left, right, U turn, under pass, and over pass, except for going straight. For example, the guidance code can include road type, link type, and the direction that the vehicle is to take at an intersection. The road code indicates road type (e.g., highway, freeway, local road, driveway, normal road, etc.). The latitude and longitude coordinates can be expressed as "mesh code+ coordinates in the mesh".

The latitude and longitude coordinates of the mesh origin can also be expressed as a mesh code. Its detailed description is avoided because different maps use different formats.

The latitude and longitude coordinates of shape points #1, #2, and #3 are detected from the known coordinates of the mesh origin and the highest mesh point. The latitude and longitude coordinates can be expressed as mesh coordinates.

Upon receipt of the thus-constituted route guidance data, the navigation terminal stores it in the route guidance data storage 1101 according to the embodiment of the present invention. Then if the user chooses the preview menu, preview information is provided in text or in image. This will be described referring to FIGS. 8A and 8B.

Figure 8A:
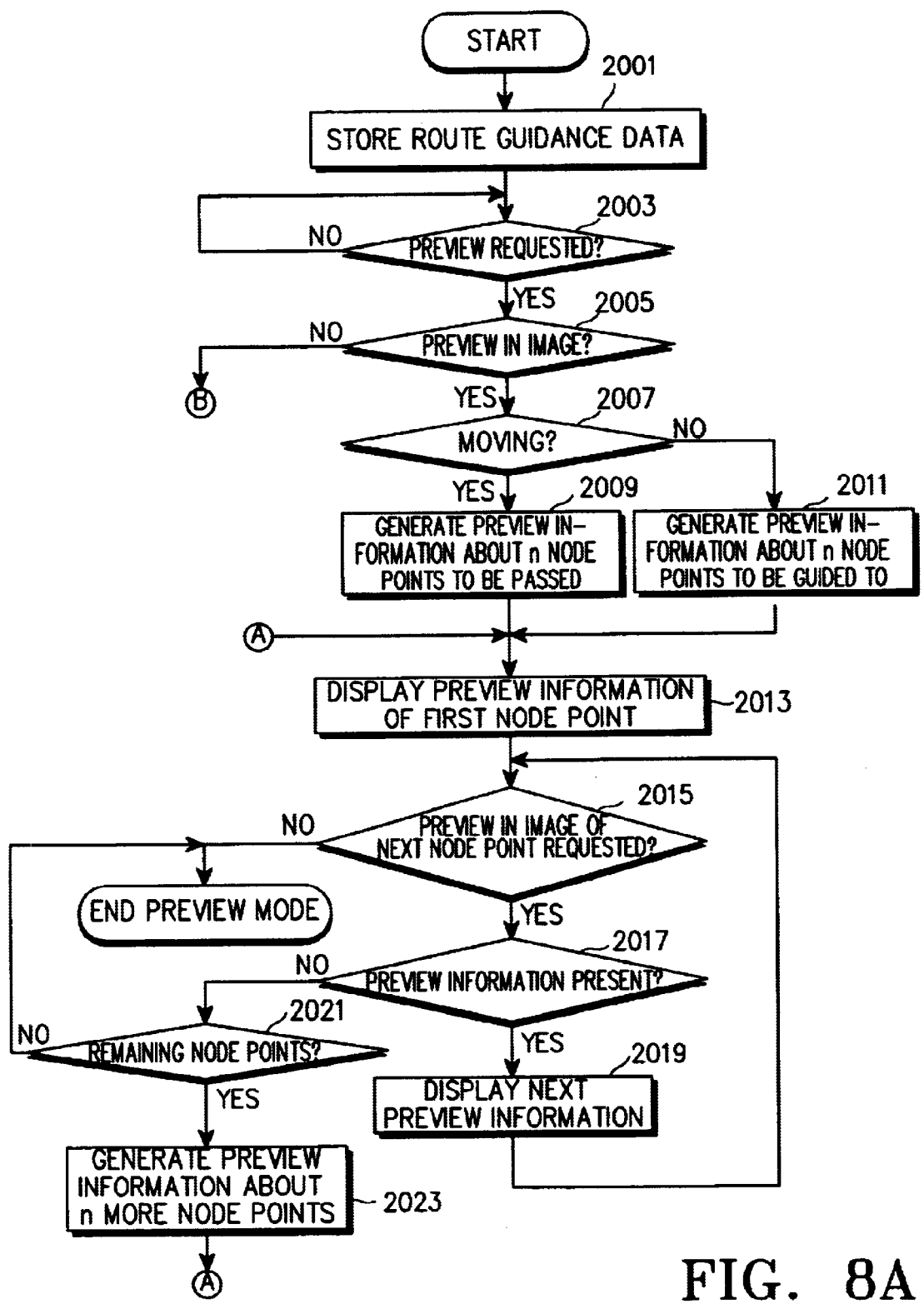
FIG. 8A is a method of operation for providing preview information in image in the navigation terminal according to the present invention.

A graphical presentation of preview information will first be described with reference to FIG. 8A. FIG. 8A is a flowchart illustrating a method of operation of the navigation terminal for providing preview information in image according to the present invention. The navigation terminal stores received route guidance data in step 2001. The route guide 1150 of the navigation terminal determines whether the user has selected the preview menu in step 2003. Upon request for preview information, the route guide 1150 determines whether preview information in image has been requested in step 2005. In the case of a preview-in-image request, the route guide 1150 goes to step 2007. In the case of a preview-in-text request, the route guide 1150 goes to step 2025 which will be described later in FIG. 8B.

In step 2007, the route guide 1150 determines whether the vehicle is moving. If the vehicle is moving, the route guide 1150 goes to step 2009 and if the vehicle is stationary, the route guide 1150 goes to step 2011. In step 2009, the route guide 1150 extracts detailed information about n node points that the vehicle has not passed through yet, generates visual preview information about each of the n node points, and stores the visual preview information. Here, n is at least 2. The route guide 1150 extracts detailed information about n node points from the first node point to be guided to from the route guidance data, generates visual preview information about each of the n node points, and stores the visual preview information in step 2011. After either step 2009 or 2011, the route guide 1150 displays the first visual preview information among n pieces of visual preview information in step 2013, as illustrated in FIG. 10.

Figure 10:
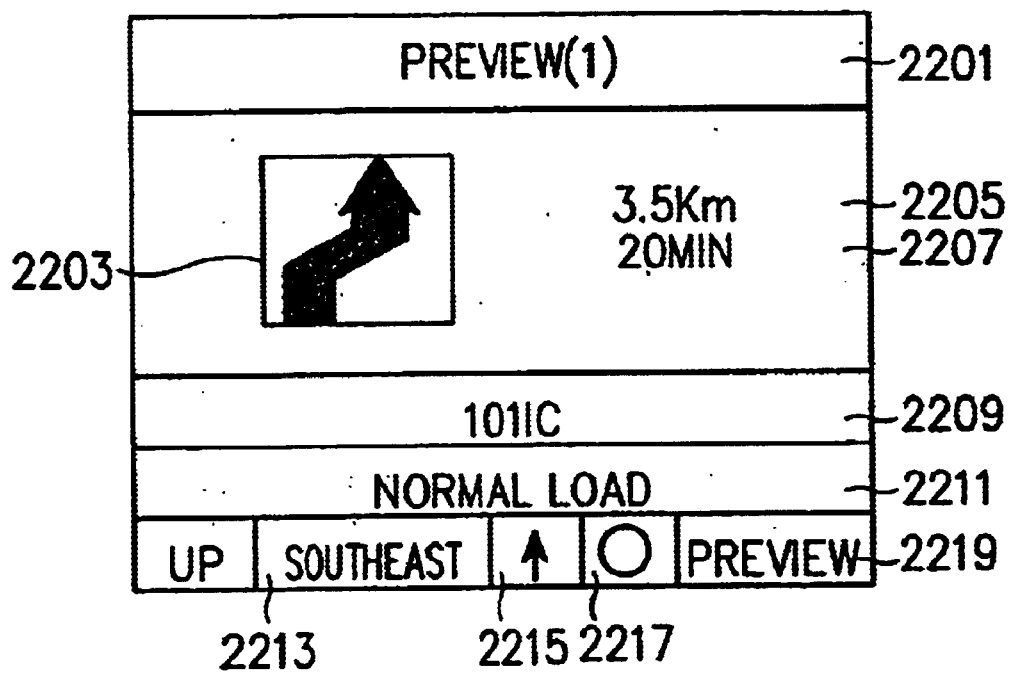
FIG. 10 illustrates a graphical presentation of preview information according to the embodiment of the present invention.

FIG. 10 illustrates a visual presentation of preview information according to the embodiment of the present invention. Referring to FIG. 10, the visual preview information contains a preview sequence number 2201, the direction 2203 that the vehicle is supposed to take at the next node point, distance to the next node point 2205, expected time to the next node point 2207, the name of the next node point 2209, a road type at the next node point 2211, the direction that the vehicle is pointing 2213, the direction to a destination 2215, GPS signal reception status 2217, and a menu notification 2219.

The preview information in image according to the present invention contains only information related directly to the destination from optimum route information. The directly related information means information about routes by which the vehicle is guided to the destination. For example, if a highway exists in the optimum route, information about the entrance and exit of the highway is related directly to a route that the vehicle is to take. In this case, auxiliary information such as information about an interchange linked to a location other than the destination is not provided to the user. Therefore, the volume of computation required to present preview information in image is reduced.

Returning to FIG. 8A, the route guide 1150 determines whether the user has requested a visual presentation of preview information about the next node point within a predetermined time in step 2015. If he has, the route guide 1150 goes to step 2017 and otherwise, the preview mode ends. In step 2017, the route guide 1150 determines whether there is visual preview information about the next node point. In the presence of the preview information in image, the route guide 1150 goes to step 2019 and in the absence of the preview information in image, the route guide 1150 goes to step 2021. In step 2019, the route guide 1150 displays the visual preview information of the next node point and then returns to step 2015. In step 2021, the route guide 1150 determines whether there remain node points to which the vehicle is to be guided. If there remain node points to be guided to, the route guide 1150 extracts detailed route information about the next n node points, generates corresponding preview information, and stores it in step 2023. Then the route guide 1150 returns to step 2013.

Figure 8B:
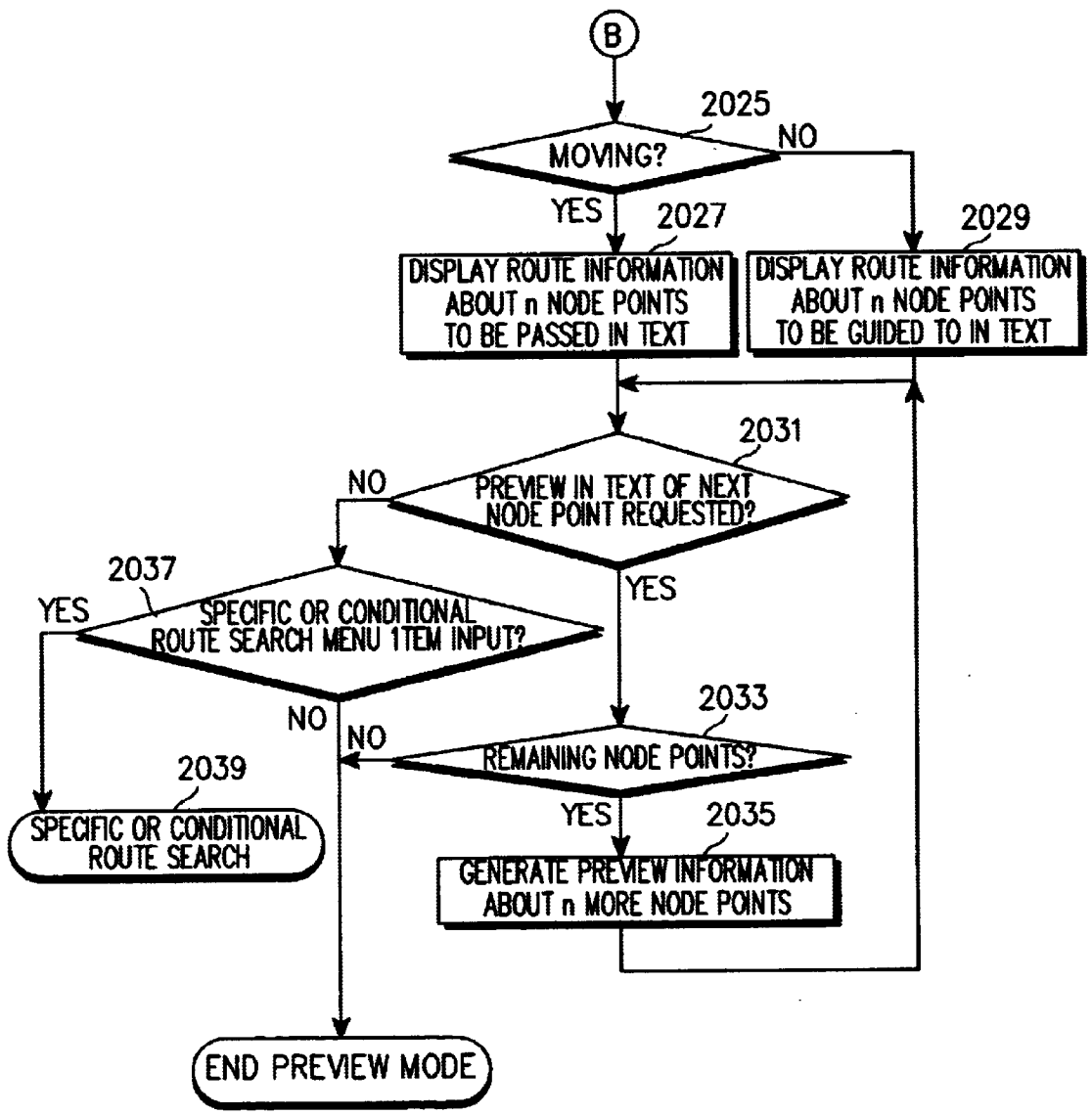
FIG. 8B is a method of operation for providing preview information in text in the navigation terminal according to the present invention.

Meanwhile, if the user has not chosen the preview-in-image menu in step 2005, the route guide 1150 jumps to step 2025 in FIG. 8B. FIG. 8B is a flowchart illustrating the operation of the navigation terminal for providing preview information in text according to the present invention. Referring to FIG. 8B, the route guide 1150 determines whether the vehicle is moving in step 2025. If it is moving, the route guide 1150 goes to step 2027 and otherwise, the route guide goes to step 2029. In step 2027, the route guide 1150 extracts route information about n node points that the vehicle has not passed through yet and displays the route information in text. Here, n is at least 2. The route guide 1150 extracts route information about n node points to be guided to from the route guidance data and displays the route information in text along with specific route search menu items in step 2029. The preview information in text contains distance to an nth node point, expected time, bearing, and intersections, entrance/exit ICs (Interchanges), passing ICs, JCs (Junctions, i.e., a road connected from a highway to another highway), provincial roads, and streets that are on the optimum route. This comprehensive route information is illustrated in FIG. 9.

Figure 9:
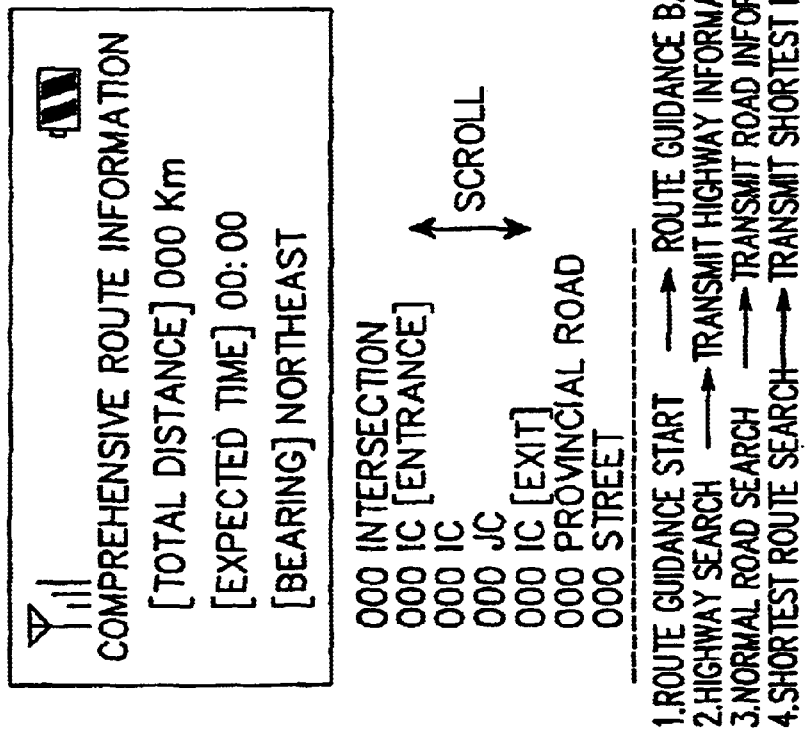
FIG. 9 illustrates a presentation of preview information in text according to the embodiment of the present invention.

FIG. 9 illustrates a presentation of preview information in text and specific route search menu items according to the embodiment of the present invention. Referring to FIG. 9, the comprehensive route information contains total distance to a destination, expected time, bearing, intersections, entrance/exit ICs, passing ICs, JCs, provincial roads, streets, etc. The total distance is the sum of the distances between node points on the optimum route. If the traffic information is involved in real time, the expected time is calculated by summing the present vehicle velocities between node points, and otherwise, it is calculated by summing the average vehicle velocities between node points. Bearing is the direction the driver is aiming at to reach the destination from where the vehicle is currently located. It is expressed as north, northeast, east, southeast, south, southwest, west, northwest, etc. The intersection information indicates the name of an intersection included in the route guidance data so that the driver can expect what route to take just by checking signposts on roads without referring to map data. The IC and JC information helps the driver to travel on highways. The provincial road information provides the number of a provincial road to take to the driver.

Returning to FIG. 8B, after either step 2027 or 2029, the route guide 1150 determines whether the user has requested a presentation of preview information in text about the next node point within a predetermined time in step 2031. If the user has, the route guide 1150 goes to step 2033 and otherwise, the route guide 1150 goes to step 2037. In step 2033, the route guide 1150 determines whether there is preview information in text about the next node point. In the presence of the preview information in text of the next node point, the route guide 1150 goes to step 2035 and in the absence of the preview information in text of the next node point, the preview mode ends. In step 2035, the route guide 1150 displays the preview information of the next node point in text and then returns to step 2031.

Meanwhile, the route guide 1150 determines whether the user has selected one of the specific route search menu items in step 2037. Upon selection of a specific or conditional route search menu item, the route guide 1150 goes to step 2039. If no specific route search menu item is selected, the preview mode ends.

In step 2039, the route guide 1150 performs an operation related with the selected specific or conditional route search menu item. According to the embodiment of the present invention, the menu items are guidance start, highway search, normal road search, and shortest route search. The menus items displayed with the comprehensive route information are used for the user to request detailed guidance of the route or information about a particular route. The route guidance start menu item is selected for detailed guidance based on the route guidance data. Upon selection of the route guidance start menu item, the route guide 1150 displays a route in detail based on the route guidance data received from the information center 100. The highway search menu item is used to request route information including highway information to the information center 100 if the received route information is about roads except highways. Upon selection of the highway search menu item, the navigation terminal transmits highway information request data and the present coordinates data to the information center 100. The normal road search menu item is used to request route information including normal road information to the information center 100 if the route information received from the information center 100 focuses on highways. Upon selection of the normal road search menu item, the navigation terminal transmits normal road information request data and the present coordinates data to the information center 100. If the received route information reflects the present traffic information, the user can request shortest route information that does not reflect the present traffic information to the information center 100 by selecting the shortest route search menu item. Upon selection of the shortest route search menu item, the navigation terminal transmits shortest route information request data and the present coordinates data to the information center 100. When receiving the above request data related with the menu items, the information center 100 generates appropriate route guidance data and transmits it to the navigation terminal. The comprehensive route information and the menu items are displayed by the use of a scroll key.

In accordance with the present invention as described above, comprehensive optimum route information is provided to a user based on route guidance data regardless of whether a moveable object is moving or not by visually displaying preview information about each node on the optimum route. Therefore, the user can grasp the optimum route easily and correctly.

While the invention has been shown and described with reference to a certain preferred embodiment thereof, it will be understood by those skilled in the art that various changes in form and details may be made therein without departing from the spirit and scope of the invention as defined by the appended claims.

What is claimed is:

1. A route guiding method in a navigation system comprising an information center including a map database, a navigation terminal located within a moveable object including a mobile terminal, wirelessly connected to a wireless network, and an ITS (Intelligent Transportation System) terminal with a GPS (Global Positioning System) device for detecting a current location of the moveable object, the wireless network for connecting the information center and the navigation terminal wirelessly, the method comprising the steps of:

(1) receiving route guidance data by which the moveable object is guided to a destination via a plurality of node points on an optimum route at the navigation terminal from the information center;

(2) determining whether a user has requested a preview to receive comprehensive optimum route information;

(3) determining whether the user has requested the preview in text or in image if the preview has been requested;

(4) displaying the comprehensive route information in text upon request for the preview in text; and (5) generating preview information about each node point on the optimum route based on the route guidance data, wherein said generating is performed by generating preview information about each of a plurality of node points through which the moveable object is to pass among node points included in the route guidance data if the moveable object is moving via the optimum route, and displaying the preview information upon request.

2. The route guidance method of claim 1, wherein the generating step comprises the steps of:

determining whether the moveable object is moving via the optimum route;

storing the preview information;

displaying the preview information of a first node point to be passed in image; and displaying the preview information of a next node point to be passed in image upon request for a preview of the next node point.

3. The route guidance method of claim 2, further comprising the steps of:

generating preview information about each of a plurality of node points to which the moveable object is to be guided among node points contained in the route guidance data if the moveable object is not moving via the optimum route;

storing the preview information;

displaying the preview information of a first node point to be guided to in image; and displaying the preview information of a next node point to be guided to in image upon request for a preview of the next node point.

4. The route guidance method of claim 3, further comprising the steps of:

determining whether there remain node points to be guided to if there is no stored preview information upon request for a preview of the next node point;

generating preview information about a plurality of node points among the remaining node points if there remain node points to be guided to;

storing the preview information; and displaying the preview information of a first node point to be guided to in image.

5. The route guidance method of claim 2, further comprising the steps of:

determining whether there remain node points to be guided to if there is no stored preview information upon request for a preview of the next node point;

generating preview information about a plurality of node points among the remaining node points if there remain node points to be guided to;

storing the preview information; and displaying the preview information of a first node point to be guided to in image.

6. The route guidance method of claim 1, wherein the preview information contains at least one of a preview sequence number, a direction that the moveable object is to take at a next node point, a distance to the next node point, an expected time to the next node point, a name of the next node point, a road type at the next node point, a direction that the moveable object is pointing, a direction to a destination, GPS signal reception status, and a menu notification.

7. The route guidance method of claim 1, wherein the displaying step comprises the steps of:

extracting route information about a plurality of node points and displaying the route information in text; and determining whether there remain node points to be guided to upon request for a preview of a node point following the plurality of node points; and extracting route information about a plurality of node points following the previewed nodes points if there remain node points to be guided to and displaying the route information.

8. The route guidance method of claim 1, wherein the displaying step comprises the steps of:

determining whether the moveable object is moving;

extracting route information about each of a plurality of node points through which the moveable object is to pass if the moveable object is moving and displaying the route information in text; and extracting route information about each of a plurality of node points to the moveable object is to be guided if the moveable object is not moving and displaying the route information in text.

9. The route guidance method of claim 1, wherein the comprehensive route information displayed in text includes at least one of a total distance to a destination, an expected time, a direction to the destination, intersections in the optimum route, entrance and exit interchanges, passing interchanges, provincial roads, and streets.

10. The route guidance method of claim 1, wherein specific route search menu items for requesting detailed or conditional route guidance to the information center are displayed when the comprehensive route information is displayed in text.

11. The route guidance method of claim 10, wherein the specific route search menu items include a search for an optimum route running through a particular road, and a request for the conditional route guidance.

12. A route guiding method in a navigation system comprising an information center including a map database, a navigation terminal located within a moveable object including a mobile terminal, wirelessly connected to a wireless network, and an ITS (Intelligent Transportation System) terminal with a GPS (Global Positioning System) device for detecting a current location of the moveable object, and the wireless network for connecting the information center and the navigation terminal wirelessly, the method comprising the steps of:

receiving route guidance data by which the moveable object is guided to a destination via a plurality of node points in an optimum route at the navigation terminal from the information center; and displaying route information about some of the node points in text if a user requests a preview of the optimum route, and displaying the preview information sequentially, wherein said displaying route information is performed by generating preview information about each of a plurality of node points through which the moveable object is to pass among node points included in the route guidance data if the moveable object is moving via the optimum route.

13. A route guiding method in a navigation system comprising an information center including a map database, a navigation terminal located within a moveable object including a mobile terminal, wirelessly connected to a wireless network, and an ITS (Intelligent Transportation System) terminal with a GPS (Global Positioning System) device for detecting a current location of the moveable object, and the wireless network for connecting the information center and the navigation terminal wirelessly, the method comprising the steps of:

receiving route guidance data by which the moveable object is guided to a destination via a plurality of node points in an optimum route at the navigation terminal from the information center; and generating preview information about each of the node points based on the route guidance data if a user requests a preview of the optimum route, wherein said generating is performed by generating preview information about each of a plurality of node points through which the moveable object is to pass among node points included in the route guidance data if the moveable object is moving via the optimum route, and displaying the preview information sequentially.

* * * * *